United States Patent
Rendon et al.

(10) Patent No.: US 9,289,931 B2
(45) Date of Patent: Mar. 22, 2016

(54) ULTRASONIC-ASSISTED MOLDING OF PRECISELY-SHAPED ARTICLES AND METHODS

(75) Inventors: Stanley Rendon, Eagan, MN (US); Dennis E. Ferguson, Mahtomedi, MN (US); Donald L. Pochardt, Hastings, MN (US); Joseph S. Warner, Hammond, WI (US); Timothy J. Rowell, St. Paul, MN (US); Peter T. Benson, North St. Paul, MN (US); Satinder K. Nayar, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 414 days.

(21) Appl. No.: 14/003,045

(22) PCT Filed: Mar. 14, 2012

(86) PCT No.: PCT/US2012/029035
§ 371 (c)(1),
(2), (4) Date: Sep. 4, 2013

(87) PCT Pub. No.: WO2012/125697
PCT Pub. Date: Sep. 20, 2012

(65) Prior Publication Data
US 2013/0345384 A1 Dec. 26, 2013

Related U.S. Application Data

(60) Provisional application No. 61/452,925, filed on Mar. 15, 2011.

(51) Int. Cl.
*B29C 45/56* (2006.01)
*B29C 45/73* (2006.01)
(Continued)

(52) U.S. Cl.
CPC ............ *B29C 45/73* (2013.01); *B29C 45/0025* (2013.01); *B29C 45/568* (2013.01);
(Continued)

(58) Field of Classification Search
CPC .... B29C 45/73; B29C 45/0025; B29C 45/568
See application file for complete search history.

(56) References Cited

U.S. PATENT DOCUMENTS

| 3,246,055 A | 4/1966 | Pendleton |
| 4,678,420 A * | 7/1987 | Inoue ..................... B29C 45/18 425/144 |

(Continued)

FOREIGN PATENT DOCUMENTS

| CN | 101500778 | 8/2009 |
| DE | 10153706 A1 | 7/2003 |

(Continued)

OTHER PUBLICATIONS

Macosko, C.; "Rheology: Principles, Measurements, and Applications"; Wiley-VCH, 1994; Cover, table of contents and p. 393 (10 pgs).

(Continued)

*Primary Examiner* — Galen Hauth
(74) *Attorney, Agent, or Firm* — James A. Baker

(57) ABSTRACT

An ultrasonic-assisted injection molding system and method for making precisely-shaped articles. A source of ultrasonic energy is positioned to apply vibrational energy to a mold cavity connected to at least one gate in flow communication with a source of molten (co)polymer. The mold is heated to a temperature of 104-116° C., and the molten (co)polymer is injected into the mold cavity. After cooling the mold until the molten (co)polymer within the gate has solidified, ultrasonic energy is applied to the mold without remelting the solidified (co)polymer within the gate until the temperature increases to 116-122° C., thereby substantially relieving flow induced stresses. The mold is then cooled until the temperature decreases to 101-107° C., and is thereafter heated until the temperature increases to 116-122° C., thereby substantially relieving any thermally induced stresses. The mold is cooled until the molten (co)polymer has solidified, thereby forming a precision molded plastic optical element.

19 Claims, 7 Drawing Sheets

(51) Int. Cl.
   *B29C 45/72*    (2006.01)
   *B29C 45/00*    (2006.01)
   *C08F 220/06*   (2006.01)
   *B29L 11/00*    (2006.01)

(52) U.S. Cl.
   CPC ......... *B29C45/7207* (2013.01); *C08F 220/06* (2013.01); *B29C 2045/7393* (2013.01); *B29L 2011/00* (2013.01)

(56) References Cited

U.S. PATENT DOCUMENTS

| | | | |
|---|---|---|---|
| 5,017,311 A | 5/1991 | Furusawa et al. | |
| 5,376,317 A | 12/1994 | Maus et al. | |
| 6,041,467 A * | 3/2000 | Roberts | A46B 9/005 |
| | | | 132/309 |
| 6,416,690 B1 * | 7/2002 | Soane | B32B 27/00 |
| | | | 264/1.36 |
| 6,464,485 B1 | 10/2002 | Iida et al. | |
| 6,764,637 B2 | 7/2004 | Faulkner et al. | |
| 2005/0189665 A1 | 9/2005 | Nishigaki | |
| 2006/0210664 A1 | 9/2006 | Suetsugu et al. | |
| 2006/0249864 A1 | 11/2006 | Saito et al. | |
| 2008/0088066 A1 | 4/2008 | Ferguson et al. | |
| 2009/0230593 A1 | 9/2009 | Satoji et al. | |
| 2010/0159197 A1 | 6/2010 | Ferguson et al. | |
| 2010/0327470 A1 * | 12/2010 | Protte | B29C 45/568 |
| | | | 264/1.24 |

FOREIGN PATENT DOCUMENTS

| | | |
|---|---|---|
| GB | 2306378 A | 5/1997 |
| JP | S8140222 | 8/1983 |
| JP | H05-329866 A | 12/1993 |
| JP | H06262648 A | 9/1994 |
| JP | H06-328451 | 11/1994 |
| JP | 2006-007620 | 1/2006 |
| JP | 2001-079875 | 3/2007 |
| WO | WO 2004/096521 | 11/2004 |
| WO | WO 2005/082596 | 9/2005 |
| WO | WO 2006/062974 | 6/2006 |
| WO | WO 2008/157592 | 12/2008 |

OTHER PUBLICATIONS

Storck, H. et al.; "The effect of friction reduction in presence of ultrasonic vibrations and its relevance to travelling wave ultrasonic motors"; Ultrasonics; vol. 40; 2002; pp. 379-383.

* cited by examiner

ULTRASONIC-ASSISTED MOLDING OF PRECISELY-SHAPED ARTICLES AND METHODS

CROSS REFERENCE TO RELATED APPLICATION

This application claims the benefit of U.S. Provisional Patent Application No. 61/452,925, filed Mar. 15, 2011, the disclosure of which is incorporated by reference herein in its entirety.

TECHNICAL FIELD

The present disclosure relates to ultrasonic-assisted molding methods and related precisely-shaped molded articles, and more particularly to ultrasonic-assisted injection molding methods for producing precisely-shaped optical elements.

BACKGROUND

Molded articles are well known and commonly used. Molded articles having delicate structures formed therein or thereon can be challenging to mold and to subsequently process and handle. Injection molding small delicate articles is typically accomplished by injecting molten (co)polymer into a mold cavity, applying additional heat to the molten (co)polymer while in the mold cavity for a time sufficient to allow the molten (co)polymer to flow into the small crevices within the mold cavity, and subsequently cooling the mold to allow the molten (co)polymer to solidify within the mold cavity, thereby forming an injection molded article.

SUMMARY

In one aspect, the disclosure describes a molding method including the steps of:

providing an injection mold having a first mold member and at least one movable mold member that can move toward and away from the first mold member to close the mold, wherein a mold cavity is formed in at least one of the first or movable mold members, the cavity having at least one gate therein, and further wherein a source of ultrasonic energy is positioned to apply ultrasonic energy to the cavity;

closing the mold, whereby the at least one gate is fluidly connected to a source of molten (co)polymer;

heating the mold to a mold temperature measured adjacent to the cavity of from 104° C. to 116° C.;

thereafter injecting the molten (co)polymer into the cavity through the at least one gate of the closed mold to substantially fill the cavity and the gate with the molten (co)polymer;

allowing the closed mold to cool until the molten (co)polymer within the gate has solidified; applying ultrasonic energy from the source of ultrasonic energy to the molten (co)polymer in the cavity of the closed mold without remelting the solidified (co)polymer within the gate until the mold temperature has increased to between about 116° C. and 122° C., thereby substantially relieving any flow induced stresses in the molten (co)polymer;

thereafter cooling the closed mold until the mold temperature has decreased to about 101° C. and 107° C.; thereafter heating the closed mold until the mold temperature has increased to between about 116° C. and 122° C., thereby substantially relieving any thermally induced stresses in the molten (co)polymer; and thereafter allowing the mold to cool until the molten (co)polymer has solidified within the mold, thereby forming an injection molded article.

In some exemplary embodiments, heating the mold to the mold temperature from 104° C. to 116° C. occurs after closing the mold. In any of the foregoing exemplary molding methods, applying ultrasonic energy from the source of ultrasonic energy to the molten (co)polymer in the cavity of the closed mold until the mold temperature has increased to between 116° C. and 122° C. begins only after allowing the closed mold to cool until the molten (co)polymer within the gate has solidified. In some exemplary embodiments, injecting the molten (co)polymer into the cavity further includes applying ultrasonic energy from the source of ultrasonic energy to the molten (co)polymer within the cavity. In certain exemplary embodiments, allowing the closed mold to cool until the (co)polymer in the gate has solidified comprises discontinuing applying ultrasonic energy to the cavity.

In additional exemplary embodiments of the foregoing molding methods, injecting the molten (co)polymer into the cavity through the at least one gate of the closed mold takes from about 0.5 to about 0.6 seconds. In some exemplary embodiments, allowing the closed mold to cool until the (co)polymer in the gate has solidified begins about 2 seconds and ends about 61 seconds after beginning the injecting of the molten (co)polymer into the cavity.

In further exemplary embodiments, applying ultrasonic energy from the source of ultrasonic energy to the molten (co)polymer within the cavity begins about 61 seconds and ends about 80 seconds after beginning the injecting of the molten (co)polymer into the cavity. In further exemplary embodiments, allowing the closed mold to cool until the mold temperature has decreased to about 101° C. and 107° C. begins about 62 seconds and ends about 237 seconds after beginning the injecting of the molten (co)polymer into the cavity.

In certain exemplary embodiments, heating the closed mold until the mold temperature has increased to between about 116° C. and 122° C. begins about 70 seconds to 115 seconds after beginning the injecting of the molten (co)polymer into the cavity, and ends about 70 to 110 seconds after heating begins. In some exemplary embodiments, the total time elapsed from closing the mold until the (co)polymer has solidified within the mold, is at least about 145 seconds, and less than about 240 seconds.

In some particular exemplary embodiments of the foregoing aspect and embodiments, the molding method further includes removing the injection molded article from the mold cavity by means of an ejector means. In some exemplary embodiments, the ejector means is selected from one or more of an ejector pin, a lifter, a stripper plate, or a combination thereof.

In further exemplary embodiments of the foregoing molding methods, a quantity of molten (co)polymer injected into the cavity is greater than a quantity required to fill the mold cavity, and excess (co)polymer flows out of the cavity through a vent. In certain exemplary embodiments, injecting the molten (co)polymer into the mold cavity comprises injecting the molten (co)polymer from a manifold. In some exemplary embodiments, the inlet gate is at the center of one side of the mold cavity. In other exemplary embodiments, the molten (co)polymer is injected into the mold cavity from a first side of the mold cavity adjoining the first mold member, and the ultrasonic energy is applied from a second side of the mold cavity adjoining the movable mold member.

In additional exemplary embodiments of the foregoing molding methods, heating the mold cavity is carried out using electrical resistance heating, electromagnetic induction heating, dielectric heating, thermoelectric heating, heating by application of ultrasonic energy, or a combination thereof. In some particular exemplary embodiments, heating the mold cavity is carried out using electrical resistance heating, and further wherein at least one electrical resistance heater is positioned proximate the mold cavity so as to enable heating the (co)polymer within the mold cavity at a rate sufficient to cause the temperature of the molten (co)polymer within the mold cavity to increase at a rate of at least about 13° C. per minute.

In certain exemplary embodiments of any of the foregoing molding methods, the mold comprises a material selected from the group consisting of steel, stainless steel, copper, beryllium, aluminum, an alloy thereof, or a combination thereof. In some exemplary embodiments, the source of ultrasonic energy comprises an ultrasonic transducer, optionally including at least one of a resonant horn, a booster, a waveguide, or a combination thereof.

In another aspect, the disclosure describes a molded article made according to any of the preceding molding methods. In some exemplary embodiments, the molded article is an injection molded optical element selected from the group consisting of a lens, a prism, a mirror, a light pipe, a diffraction grating, or a combination thereof. In certain exemplary embodiments, the molded article exhibits at least one beneficial characteristic selected from the group consisting of a substantial absence of birefringence, a substantial absence of residual stresses, a substantial absence of sink marks, a substantial absence of knit marks, a substantial absence of weld lines, a substantial absence of voids, or a combination thereof. In some particular exemplary embodiments, the (co)polymer comprises a (meth)acrylic (co)polymer.

Various aspects and advantages of exemplary embodiments of the disclosure have been summarized. The above Summary is not intended to describe each illustrated embodiment or every implementation of the present invention. The Drawings and the Detailed Description that follow more particularly exemplify certain preferred embodiments using the principles disclosed herein.

Figure 1:
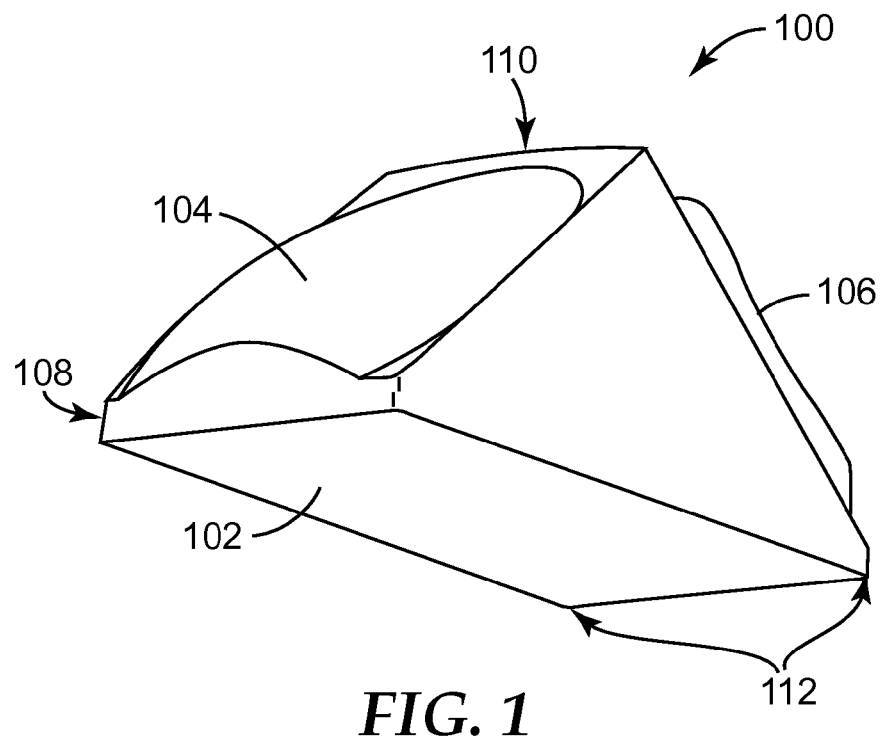
FIG. 1 is a perspective view of an exemplary precisely-shaped article according to certain embodiments of the present disclosure.

While the above-identified drawings, which may not be drawn to scale, set forth various embodiments of the present disclosure, other embodiments are also contemplated, as noted in the Detailed Description. In all cases, this disclosure describes the presently disclosed invention by way of representation of exemplary embodiments and not by express limitations. It should be understood that numerous other modifications and embodiments can be devised by those skilled in the art, which fall within the scope and spirit of this invention.

DETAILED DESCRIPTION

As used in this specification and the appended embodiments, the singular forms "a", "an", and "the" include plural referents unless the content clearly dictates otherwise. Thus, for example, reference to fine fibers containing "a compound" includes a mixture of two or more compounds. As used in this specification and the appended embodiments, the term "or" is generally employed in its sense including "and/or" unless the content clearly dictates otherwise.

As used in this specification, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

For the following Glossary of defined terms, these definitions shall be applied for the entire application, unless a different definition is provided in the claims or elsewhere in the specification.

GLOSSARY

The term "(co)polymer" means a homopolymer or a copolymer.

The term "(meth)acrylic" with respect to a monomer means a vinyl-functional alkyl ester formed as the reaction product of an alcohol with an acrylic or a methacrylic acid, for example, acrylic acid or methacrylic acid. With respect to a (co)polymer, the term means a (co)polymer formed by polymerizing one or more (meth)acrylic monomers.

The term "cycle time" means the time from closing of the injection molding apparatus, with the carrier web between the first and movable mold members, until the indexing of the carrier web, moving the molded article or articles away from the mold cavity area and positioning part of the carrier web for the next mold cycle. During each mold cycle, the cycle time should be sufficient to allow the mold cavity (including any micro-cavities in the insert) to be substantially filled with molten (co)polymer and for the (co)polymer to subsequently cool below the (co)polymer softening point.

With reference to a mold, the term "feature" means a three dimensional cavity, recess, or depression within a mold cavity that may define, at least in part, the shape of an article to be molded, such as a prism or lens.

Precision optical elements (e.g. lenses, mirrors, prisms, beam splitters, polarizers, diffraction gratings, light pipes, and the like) are used in a wide variety of industrial and consumer products. For example, precision optical elements are a key component in electronic display devices (e.g. liquid crystal displays and projectors, televisions, computer monitors, e-readers, cellular phones, MP3 players, and the like). Driven by a desire to reduce both weight and manufacturing cost of such devices, manufacturers have recently turned to using optical elements formed of molded plastic material in place of the heavier and more expensive glass optical components traditionally used in such light management applications.

One of the major challenges in the production of precision molded plastic optical elements is the need to meet high standards in molding precision and quality in order to achieve the desired product performance requirements in advanced light management applications. Common practices for injection molding of plastic optical parts typically involve using methods such as coining, injection compression, variothermal response molding, slow servo driven plastic injection, and/or combinations thereof. Such practices are useful in molding simple optical elements, such as screens, diffraction gratings, and some simple lenses or mirrors.

Over the past decade, however, the complexity in optics has evolved from predominantly flat or slightly curved optical surfaces to ones having a significant amount of compound curvature along with thick and thin wall sections which limit the applicability or usage of such techniques. Furthermore, optical parts now have significantly tighter dimensional tolerance specifications that preclude several of these well-known techniques from even being considered.

The present disclosure describes precision molding methods useful in fabricating precision molded plastic optical components, for example, a polarized beam splitter (PBS). Although a PBS is used as an exemplary precision molded plastic optical element throughout this disclosure, it will be understood that the methods and apparatus described herein may be advantageously applied to produce other precision optical elements (e.g. lenses, mirrors, prisms, polarizers, diffraction gratings, light pipes, and the like).

The presently disclosed method uses ultrasonic energy to assist in the process of injection molding optical prisms of non-uniform wall thickness with very high light transmission, low haze and minimal birefringence. By ultrasonically vibrating the optical prism cavity in a mold using an acoustically tuned metallic horn it is possible, in some exemplary embodiments, to reduce the onset of thermal and shear induced stresses in the final part while drastically reducing injection molding cycle time. The use of ultrasonic energy in combination with local mold temperature thermal cycling during molding enables commercially significant improvements in optical birefringence of precision molded plastic optical elements that also help drive unit cost down via cycle time reduction.

The present disclosure illustrates, in some exemplary embodiments, a method for ultrasonically assisting the process of injection molding polarizing beam splitter (PBS) prisms of non-uniform wall thickness with very high light transmission, low haze and minimal birefringence. By ultrasonically vibrating the optical prism cavity in a mold using an acoustically tuned metallic horn, it is possible to reduce the onset of thermal and shear induced stresses in the final part while drastically reducing injection molding cycle time.

Thus, in exemplary embodiments of the presently disclosed precision molding method, filling of the mold features is aided by use of applied ultrasonic energy and/or EMI heating of mold parts as part of the molding cycle. After the (co)polymer melt has filled the mold cavity, the mold is cooled to a temperature below the (co)polymer glass transition temperature to allow for ejection of the molded article from the cavity. The combination of process parameters in the inventive process enable shorter mold cycle times than are known in the art. The presently disclosed process and apparatus enable injection molding micro-structured articles (having features with dimensions of less than 5 μm) with good fidelity (i.e., good reproduction of the very small mold features) and mold cycle times of 20 seconds or less.

The filling of the very small features of the mold is also aided by dynamic mold temperature cycling which controls the use of heat transfer means to adjust mold temperature. In dynamic mold temperature cycling, the mold is first heated to a temperature above the softening temperature of the (co)polymer to be injected (e.g., above 149° C. for polycarbonate). High mold temperature helps to keep (co)polymer melt viscosity low to facilitate filling the mold features and minimize viscoelastic skinning After formation of the molded part, the mold is cooled below the softening point to help solidify the molten (co)polymer. Methods of mold temperature thermal cycling are described in PCT International Publication No. WO 2005/082596 and U.S. Pat. No. 5,376,317.

The efficacy of dynamic mold temperature cycling is limited by the rate of mold heating and cooling. Highly thermally conductive materials (e.g., beryllium-copper alloys) can be used to improve heat transfer, but the rate of heat transfer is limited by the properties of the heat transfer means used, such as oil.

Various exemplary embodiments of the disclosure will now be described with particular reference to the Drawings. Exemplary embodiments of the invention may take on various modifications and alterations without departing from the spirit and scope of the disclosure. Accordingly, it is to be understood that the embodiments of the invention are not to be limited to the following described exemplary embodiments, but is to be controlled by the limitations set forth in the claims and any equivalents thereof.

Precision Molded Plastic Optical Elements

In one aspect, the disclosure provides a precision molded article made according to any of the molding methods described further below. In some exemplary embodiments, the precision molded article is an injection molded optical element selected from the group consisting of a lens, a prism, a mirror, a light pipe, a diffraction grating, or a combination thereof.

Referring now to the Drawings, FIG. 1 provides a perspective view of the overall 3D part geometry for an exemplary precision molded plastic optical element in the form of a polarizing beam splitting (PBS) prism 100. The prism consists of a flat backside plano surface 102 as well as a set of curved surfaces (asphere surface 104 and saddle surface 106) that help guide the light emitted from a source (e.g. a light emitting diode source not shown in the drawings) through a lens (not shown in the drawings). The asphere surface 104 and saddle surface 106 are joined at prism edge 110. An optional optical flat 108 can be used as a transition between the asphere surface 104 and the plano surface 102.

Important to the performance of the prism 100 when used as a polarizing beam splitter (e.g. in a micro-projector) is the need for an extremely flat plano surface 102 (approximately 3 micrometers (μm) flatness), satisfying the exact curvature requirements of the asphere surface 104 and the saddle surface 106, as well as maintaining very low birefringence across the thickness (112) of the molded part.

Unfortunately, a number of physical defects (e.g. knit lines, voids, and sinks) and/or optical defects (e.g. bi-refringence caused by thermally and/or shear induced residual stresses produced, for example, in passing the molten (co)polymer through mold gates, or into vertices or corners of the mold) can be introduced during molding of plastic optical elements using conventional injection molding methods. Furthermore, while such physical and optical defects are generally known in the art, the precise factors which cause these defects and methods for controlling them have been heretofore unknown, and the identification of such factors and invention of methods for controlling physical and optical defects in precision molded plastic optical elements are within the scope of the present disclosure.

For example, the onset of knit line formation on the optical prism is primarily driven by folding of molten plastic as it enters the cavity. The very low Reynolds number flow ($\sim 10^{-4}$) fundamentally prevents the rapidly solidifying viscous resin from mixing as it enters the cold cavity and thus a knit line is formed. Void and sink initiation are a result of fast differential shrinkage and insufficient packing pressures to sustain changes in specific volume of the plastic during cooling. Moreover, the onset of plastic shrink also results in the thermally-induced stresses which in turn lead to birefringence and high levels of retardance.

By applying ultrasonic energy directly to the mold cavity during melt injection, it is possible to mitigate the effects of shear and thermally induced stresses while having the ability to operate in a pseudo-low stress and pseudo-high velocity region of the characteristic viscosity curve.

Another molding parameter important to the minimization of physical and/or optical defects is cooling time. Cooling time is defined here as the length of time that the rapidly solidifying molten plastic spends in the mold cavity prior to mold open and part ejection. Predictive models of the skin and core cooling rates also predict similar trends in cooling profiles as does the overall cooling model for the entire part thickness. These predictions suggest that in the absence of ultrasonic energy cooling times in excess of 420 seconds are needed to ensure that the final part is free of any part distortion or physical defects. Because ultrasonic energy helps relieve the thermal shock associated in going form a heated barrel into a cold mold cavity, it is, in some exemplary embodiments, possible to reduce the cooling time requirement needed for before ejection of a substantially defect-free precision molded article from the mold.

Thus, in certain exemplary embodiments, precision molded articles according to the present disclosure exhibit at least one beneficial characteristic selected from the group consisting of a substantial absence of birefringence, a substantial absence of residual stresses, a substantial absence of sink marks, a substantial absence of knit marks, a substantial absence of weld lines, a substantial absence of voids, or a combination thereof.

Injection Molding System for Precision Molded Plastic Optical Elements

Figure 2:
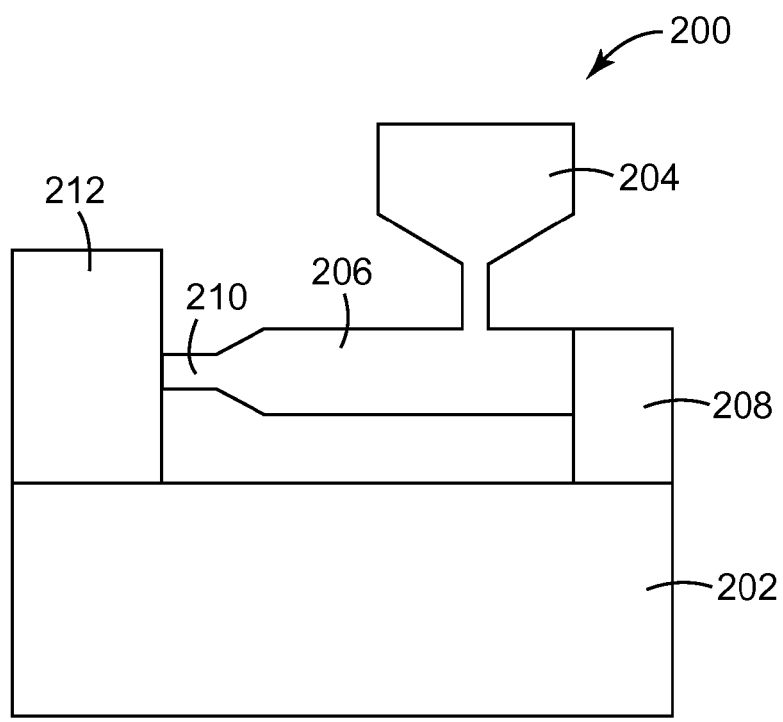
FIG. 2 is a schematic side view of an exemplary injection molding system according to certain embodiments of the present disclosure.

In a further aspect, the disclosure describes a molding system. FIG. 2 provides a schematic side view of an exemplary injection molding system 200 according to another exemplary embodiment of the present disclosure is shown. The injection molding system may be mounted on a base 202. In the depicted embodiment, the system 200 includes a hopper 204 for receiving the plastic material to be melted (e.g., plastic pellets), a motor 208 for powering the system 200, a heated barrel or chamber 206 for melting and feeding the plastic material through an injection port 210 into a injection molding apparatus 212 in which an ultrasonic horn (shown in FIG. 3) is installed.

Figure 3:
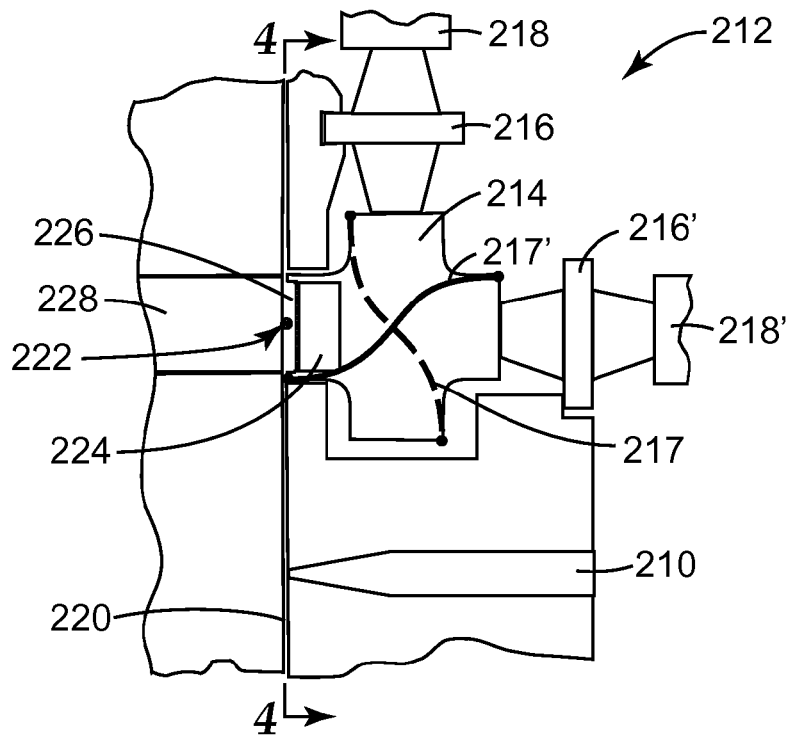
FIG. 3 is a schematic side view of an exemplary ultrasonic-assisted injection molding system including a first mold member and at least one movable mold member, shown in a closed position, useful in practicing certain embodiments of the present disclosure.

FIG. 3 provides a schematic side view of an exemplary ultrasonic-assisted injection mold 212 including a first mold member 224 and at least one movable mold member 228, shown in a closed position, useful in practicing certain embodiments of the present disclosure. In the depicted embodiment the first mold member 224 is stationary (although it could be movable) and the second mold member 228 is moveable away from the first mold member 224 in order to facilitate removal of the precision molded plastic optical element (not shown), or towards the first mold member 224 in order to form a seal with mold face 226 during a molding operation. In some exemplary embodiments, heating the mold to the mold temperature from 104° C. to 116° C. occurs after closing the mold.

In certain exemplary embodiments, injecting the molten (co)polymer into the mold cavity comprises injecting the molten (co)polymer from a manifold (not shown in the Figures) through an injection port 210. The manifold places molten (co)polymer in flow communication with a sprue 222 formed in mold face 226, and in flow communication with mold cavity 100' (not shown in FIG. 3; see FIG. 4). The sprue 222 facilitates injection of molten (co)polymer into mold cavity 100' during an injection molding operation.

Flow communication between sprue 222 and injection port 210 is provided by molten (co)polymer flow channel 220, formed when the mold face 226 of first mold member 224 is sealed against movable mold member 228 in preparation for and during a molding operation. In some exemplary embodiments, the mold cavity 100' is sealed at its surface by moving the movable mold member 228 into close proximity to the surface of the first mold member 224, and clamping the mold members with sufficient force provided by the injection molding machine. Then, molten (co)polymer is injected into the mold cavity 100' under pressure to fill the mold cavity 100' with the molten (co)polymer.

In the depicted embodiment of FIG. 3, the movable mold member 228 of the injection molding apparatus 212 includes a mechanism for applying auxiliary energy to the molten (co)polymer while the molten (co)polymer is inside the mold cavity 100'. In the depicted embodiment, the mechanism is an ultrasonic horn 214, which is configured to produce ultrasonic vibration energy. In certain presently preferred exemplary embodiments, the molten (co)polymer is injected into the mold cavity 100' from a first side of the mold cavity 100' adjoining the movable mold member 228, and ultrasonic energy is applied using a source of ultrasonic energy (e.g. ultrasonic horn 214) from a second side of the mold cavity 100' adjoining the first mold member 224.

In some exemplary embodiments, the source of ultrasonic energy comprises an ultrasonic transducer 218 and at least one resonant ultrasonic horn 214, with an optional booster 216, an optional waveguide 218, or a combination thereof. The ultrasonic horn 214 is preferably solid, but it may be hollow. Materials of construction for the horn are within the skill of the art, but are typically titanium, aluminum, steel, or ceramic. In a presently preferred embodiment, the horn material is selected to be P-20 steel, due to the surface finish requirements of the desired precision molded optical elements.

The ultrasonic energy is generally supplied by using a power source (not shown in the drawings), for example, in the range of 50 to 5,000 Watts, more preferably 100 to 4,500 Watts, even more preferably 150 to 4,000 Watts, to supply electrical energy of the desired frequency and amplitude to ultrasonic transducers 218 and 218'. Electrical energy fed to the transducers 218-218' is converted into ultrasonic vibrational energy which can be amplified or boosted using boosters 216 and 216', and transmitted via the ultrasonic horn 214.

The frequency of the ultrasonic energy can be in the range of 5,000-60,000 Hz, preferably 10,000-60,000 Hz, more preferably 20,000 Hz-60,000 Hz, or even 20,000-40,000 Hz. For a 20,000 Hz frequency, the peak-to-peak vibrational amplitude of ultrasonic horn 214 is typically less than 127 μm and can be less than 51 μm. The horn amplitude is a function of horn shape and excitation input. Amplitudes in the range of 7.5 to 15 μm have been found to be particularly useful. In a presently preferred embodiment, the ultrasonic horn 214 is configured to supply ultrasonic energy with a 1:1 gain booster, and the maximum displacement measured at the face of the horn at 100% amplitude is 0.7 mils peak to peak.

The ultrasonic vibrational energy is transmitted to the molten (co)polymer within the mold cavity 100'. Ultrasonic vibrations may be used during the velocity-pressure switchover in the injection molding process (i.e. the period when the injection molding machine is switching from filling the mold cavity 100' with (co)polymer melt to building pressure within the mold cavity 100'). The ultrasonic energy imparted to the molten (co)polymer causes the material to further flow within the mold cavity 100'.

In one exemplary presently preferred embodiment illustrated in FIG. 3, an ultrasonic horn 214 is shown positioned adjacent to first mold member 224. A mold cavity (see 100' in FIG. 4) corresponding to the geometry of the precision molded article (e.g. the polarized beam splitter, not shown in FIG. 3) is formed in mold face 226 of first mold member 224, such that ultrasonic horn 214 may apply ultrasonic energy directly to the mold cavity 100' of first mold member 224. Because the ultrasonic horn 214 experiences high force loading during operation and to minimize deflection when the second mold member 228 closes, the horn is preferably supported by two rigidly mounted boosters 216 and 216', wherein each booster is connected to an ultrasonic energy transducer 218 and 218', as shown in FIG. 3. Each ultrasonic energy transducer 218 and 218' is connected to a source of ultrasonic energy (not shown in the drawings).

A cross horn configuration for ultrasonic horn 214 is illustrated in FIG. 3. The cross horn was chosen to support the horn 214 in the cavity and yet have a way to independently resonate each horn stack formed by the ultrasonic horn 214 and the corresponding booster 216 and 216', and ultrasonic energy transducer 218 and 218', while maintaining the ultrasonic energy transducers 218 and 218' in their respective vertical or horizontal orientations outside of the first mold member 224. Die mounting holes 233 are used with bolts (not shown) to secure the first mold member 224 to ultrasonic horn 214.

FIG. 3 also shows that ultrasonic horn 214 is configured with respect to the boosters 216 and 216' and the ultrasonic energy transducers 218 and 218', such that axial antinodes of the respective ultrasonic energy waves 217 and 217' emitted from the ultrasonic energy transducers 218 and 218' produce vibrational nodes at the crossing point of the waves proximate the axial center of ultrasonic horn 214, and vibrational antinodes at the junction points of ultrasonic horn 214 with each of the boosters 216 and 216', and mold face 226.

Figure 4:
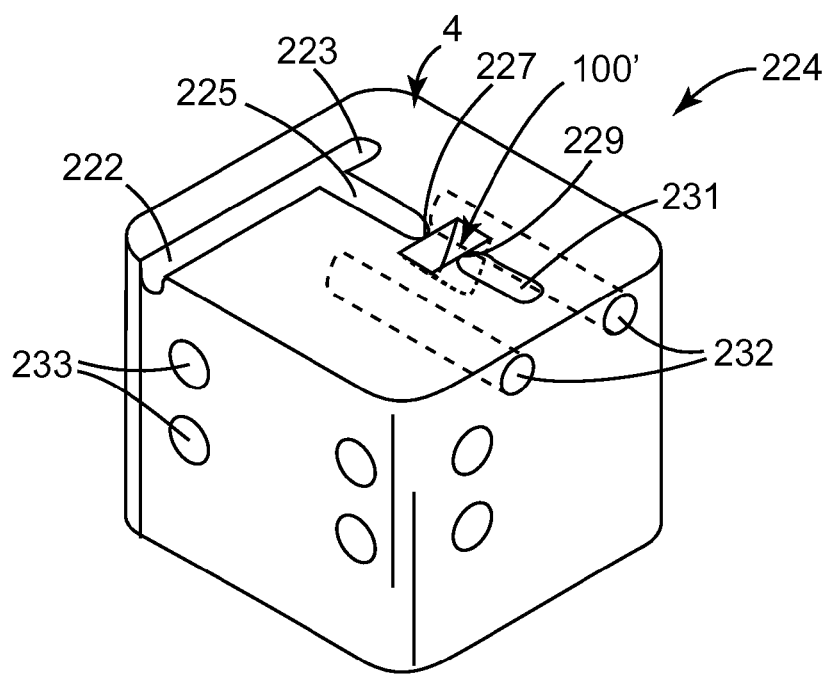
FIG. 4 is a perspective along view line 4 of the exemplary first mold member of the exemplary ultrasonic-assisted injection molding system of FIG. 3, useful in practicing certain embodiments of the present disclosure.

Referring now to FIG. 4, a perspective view of the exemplary first mold member 224 of FIG. 3 is shown in greater detail along view line 4 of FIG. 3. In the depicted exemplary embodiment, the first mold member 224 includes an inlet gate 227, connected to a sprue 222, in flow communication with mold cavity 100' through inlet runner 225, which directs molten (co)polymer into the mold cavity 100'. The sprue 222 facilitates injection of molten (co)polymer into mold cavity 100' through inlet gate 227 during an injection molding operation. In some exemplary embodiments, the inlet gate 227 is preferably positioned at or proximate the center of one side of the mold cavity, as shown in FIG. 4.

Although a single inlet gate 227 is shown as entering the cavity 100' proximate the center of a longitudinal side of the cavity 100', which is shown for illustrative purposes as having the shape of the optical beam splitting prism of FIG. 1, multiple inlet gates could also be used, and/or there could be other locations for the inlet gate(s). Relocating the gate (or gates) or varying the shape of cavity 100' is thus understood to be within the level of ordinary skill in the art.

In addition, as shown in FIG. 4, an optional cold slug or riser 223 may be placed in fluid communication with the sprue 222 as shown in FIG. 4, in order to facilitate gas removal from the inlet runner 225. An optional overflow runner 231 may be placed in flow communication with mold cavity 100' to facilitate complete filling of the mold cavity 100' with molten (co)polymer. Optional overflow runner 231 is connected to mold cavity 100' through optional exit gate 229. Optional overflow runner 231 may additionally optionally be placed in flow communication with an air vent passage (not shown) in flow communication with the exterior of first mold member 224. Optional overflow runner 231 may, for example, be ground or formed into the mold face 226 of first mold member 224 and/or the mold face of second mold member 228.

In some exemplary embodiments, the inlet runner 225 is preferably expanded to the other side of the parting line formed when the mold face 226 of first mold member 224 is sealed against movable mold member 228. Thus in some such presently preferred embodiments, this modification may act to decrease the pressure drop in the inlet runner 225. This change may also allow for use of a lower filling pressure, and thus less residual stress in the molded part. In additional presently preferred embodiments, the inlet gate 227 may be enlarged (e.g. in cross-sectional width or diameter) to reduce jetting and stress development as the (co)polymer melt enters the mold cavity 100'.

The ultrasonic horn transfers ultrasonic vibrational energy to the (co)polymer melt so that it flows more readily into the mold cavity 100', and, in some exemplary embodiments, into the sprue 222, inlet gate 227, optional cold slug or riser 223, optional exit gate 229, and optional overflow runner 231 formed in first mold member 224 (and optionally co-formed in movable mold member 228). Locating the inlet gate 227 proximate the mold cavity 100' has the advantage of reducing the electrical power (i.e. wattage) required to apply ultrasonic vibrational energy to the inlet gate 227 and mold cavity 100', as compared to other gate locations (e.g., at the perimeter of the first mold member 224'.

The inlet gate 227 results in formation of a gate well on the molded part (not shown in the drawings) which adds to the molded part thickness and thus the cooling time of the molded part, which can in turn result in higher residual stresses in the molded part associated with resin shrinkage in the gate well upon cooling of the molded part. In some exemplary embodiments, application of ultrasonic energy to the first mold member 224 may reduce or eliminate these residual stresses resulting from resin shrinkage in the gate well upon cooling of the molded part.

Application of ultrasonic vibrational energy to the first mold member 224 can also improve venting of entrapped air in the sprue 222, inlet runner 225, inlet gate 227, mold cavity 100', optional cold slug or riser 223, optional exit gate 229, and optional overflow runner 231 formed in first mold member 224 (and optionally co-formed in movable mold member 228). It should be appreciated that an exemplary first mold member 224 is shown in FIG. 4, and that many alternative mold cavity, sprue, gate, riser, and runner configurations (including both number and position of such mold features) are possible, and are within the level of ordinary skill in the art.

In some particular exemplary embodiments, the molding apparatus further includes a means for removing the injection molded article from the mold cavity 100' by means of an ejector means (not shown in the drawings), as is well known to one of ordinary skill in the art. In some exemplary embodiments, the ejector means is selected from one or more of an ejector pin, a lifter, a stripper plate, or a combination thereof.

In some exemplary embodiments, one or both of the first mold member 224 and the movable mold member 228 comprise a material selected from the group consisting of steel, stainless steel, copper, beryllium, aluminum, an alloy thereof, or a combination thereof. Preferably, at least the first mold member 224 comprises a material selected from the group consisting of steel, stainless steel, copper, beryllium, aluminum, an alloy thereof, or a combination thereof, in order to achieve good heat transfer into and out of the mold cavity 100'.

The temperature of the metal surfaces of the mold cavity during filling and packing of the (co)polymer melt into the mold cavity 100' depends on the particular (co)polymer used. Temperature is desirably sufficiently high to yield a low melt viscosity to improve the flow of (co)polymer into the mold cavity', but not high enough to degrade the (co)polymer. Typical mold temperatures for molding (co)polymers are in the range of about 60° C. to about 200° C., more preferably 100° C. to 190° C., even more preferably 120° C. to 175° C. during filling and packing; and in the range of 65° C. to 120° C., more preferably 70° C. to 110° C., even more preferably 75° C. to 105° C. during ejection of a molded part from the mold.

Temperature can be controlled by any suitable heat transfer means, for example, electrical resistance heating positioned proximate the mold cavity 100' (e.g. optional electrical resistance cartridge heaters 232 positioned, for example, as shown in FIG. 4). Optional electrical resistance cartridge heaters 232, shown positioned in the first mold member 224 proximate mold cavity 100', may be used to provide rapid heating of the mold cavity 100'. The optional electrical resistance cartridge heaters are preferably located parallel to the short edges of the prism-shaped mold cavity 100', along both short edges of the rectangular base, as shown in FIG. 4.

In one presently-preferred embodiment, the electrical resistance cartridge heaters 232 are positioned relative to the mold cavity 100' such that the heaters provide rapid heating to the (co)polymer within the mold cavity 100'. Thus, in certain exemplary embodiments, at least one electrical resistance cartridge heater is positioned within about 10 mm, more preferably 9 mm, 8 mm, 7 mm, 5 mm, 4 mm, 3 mm, 2 mm, 1 mm, or even 0.5 mm or less, of the mold cavity 100'. In certain such presently-preferred embodiments, rapid heating of the (co)polymer in the mold cavity 100' achieves a rate of temperature increase of the (co)polymer in the mold cavity 100' of at least about 5° C./sec, more preferably at least 10° C./sec, at least 15° C./sec, at least 20° C./sec, at least 25° C./sec, or even at least 30° C./sec.

In further presently-preferred embodiments, a temperature sensor (not shown in the drawings), for example a thermocouple, thermistor, resistance temperature device (RTD), or the like, is placed proximate the mold cavity 100' in order to measure a temperature which more closely approximates the temperature of the (co)polymer in the mold cavity 100'. Thus, in certain exemplary embodiments, at least one temperature sensor is positioned within about 10 mm, more preferably 9 mm, 8 mm, 7 mm, 5 mm, 4 mm, 3 mm, 2 mm, or even 1 mm, of the mold cavity 100'.

In one particular embodiment, electrical resistance heating comprises making electrical connection with the first mold member 224 (FIG. 4) and applying electrical power to the first mold member 224, thereby using the first mold member 224 itself as a resistance heater. In such an arrangement, a high current, low voltage transformer (not shown) can be used so supply electricity to the mold member 224, for example, at about 40-150 amps and about 0.5-4 volts.

The mold cavity may also be additionally or alternatively heated or cooled by other known means, for example convective heating by circulation of an appropriate heat transfer fluid to heat or cool the (co)polymer in the mold cavity 100'. Thus, in further exemplary embodiments, a circulating heat transfer fluid (e.g., oil in a temperature range of 60° C.-150° C. used for heating, or water in a temperature range of 27° C.-60° C. used for cooling) circulating in a tube or tubes (not shown in the drawings) positioned in close proximity to the mold cavity 100' may also be used, either in place of or in addition to electrical resistance heaters. In other exemplary embodiments, radiant energy (e.g., applied infrared radiation such as an infrared lamp or laser), and/or hot air flow from an external convective heat source (e.g. a forced-air heater such as a heat gun), may be used to heat the (co)polymer in the mold cavity 100'.

In such exemplary embodiments, rapid heating and/or cooling of the (co)polymer in the mold cavity 100' may be advantageously achieved. In certain such presently-preferred embodiments, rapid heating of the (co)polymer in the mold cavity 100' achieves a rate of temperature increase of the (co)polymer in the mold cavity 100' of at least about 5° C./sec, more preferably at least 10° C./sec, at least 15° C./sec, at least 20° C./sec, at least 25° C./sec, or even at least 30° C./sec. In other such presently-preferred embodiments, rapid cooling of the (co)polymer in the mold cavity 100' achieves a rate of temperature decrease of the (co)polymer in the mold cavity 100' of at least about 5° C./sec, more preferably at least 10° C./sec, at least 15° C./sec, at least 20° C./sec, at least 25° C./sec, or even at least 30° C./sec.

In an additional exemplary embodiment which may result in the advantage of rapid heating and cooling of the (co) polymer in the mold cavity 100', an electromagnetic induction (EMI) heater (not shown in the drawings), positioned in close proximity to the mold cavity 100' may also be used, either in place of or in addition to electrical resistance heaters, to heat the mold cavity 100' and/or the metal surrounding the mold cavity 100'. Suitable EMI heaters are known in the art, and generally include an induction coil housing containing an electromagnetic induction coil. Suitable EMI heating apparatus are available commercially from such companies as MSI Automation, Inc., Wichita, Kans., U.S.A. A typical EMI heater would have a power of 1-5 KW and provide output frequency in the range of 25-450 KHz for surface heating.

In certain exemplary embodiments, the EMI heater is positioned proximate the mold cavity 100' such that rapid heating and/or cooling of the (co)polymer in the mold cavity 100' may be achieved. For example, an EMI heater can be located within the first mold member 224 in a position close to the mold cavity. In certain such presently-preferred embodiments, rapid heating of the (co)polymer in the mold cavity 100' achieves a rate of temperature increase of the (co)polymer in the mold cavity 100' of at least about 5° C./sec, more preferably at least 10° C./sec, at least 15° C./sec, at least 20° C./sec, at least 25° C./sec, or even at least 30° C./sec. In other such presently-preferred embodiments, rapid cooling of the (co)polymer in the mold cavity 100' achieves a rate of temperature decrease of the (co)polymer in the mold cavity 100' of at least about 5° C./sec, more preferably at least 10° C./sec, at least 15° C./sec, at least 20° C./sec, at least 25° C./sec, or even at least 30° C./sec.

In some exemplary embodiments, EMI heating may be advantageously used in conjunction with dynamic mold temperature cycling (discussed further below). In the injection molding of articles with micro- or nano-features (e.g. precision optical elements), the temperature of the surfaces to which the (co)polymer melt is exposed can affect the quality of the molded article, and EMI heating combined with dynamic mold temperature cycling is used as a means to rapidly raise that surface temperature for each mold cycle.

Because EMI heating is focused on the surface of the mold cavity, rapid heat dissipation (e.g., into the mass of surrounding metal and heat transfer fluid) can occur after filling the mold cavity. In general, gaps between the electromagnetic induction coil housing and the mold plate face in the range of about 1.5 to 2 mm led to approximately similar temperature profiles (i.e., curve of insert temperature vs. induction coil power setting); whereas, at a smaller gap of 1016 μm, the resulting temperature increase in the mold insert was higher at comparable induction activation times (3-8 seconds).

Plastic Materials for Precision Molded Plastic Optical Elements

The (co)polymer used in the injection molding process to make molded articles may comprise a variety of (co)polymers selected based on properties such as ability to accurately reproduce the desired pattern of the mold cavity and insert, strength and toughness of the molded (co)polymer, and compatibility of the molded (co)polymer with the intended use. For example, one might choose a (co)polymer or (co)polymer blend.

In some particular exemplary embodiments, the (co)polymer comprises a (meth)acrylic (co)polymer.

Some presently preferred (co)polymeric materials may exhibit: a melt-flow index greater than 5 g/10 min., 10 g/10 min., or 20 g/10 min. measured by ASTM D1238 at 300° C. and 1.2 kg. weight; a tensile elongation at break (measured by ASTM test D638 (2.0 in/min.)) greater than 100%; and impact strength (measured by ASTM D256, "Notched Izod" 23° C. greater than 5 ft-lb/inches. Suitable (co)polymers include, but are not limited to, polyphenyl sulfides, polycarbonates (e.g., LEXAN HPS1R resin from Sabic Innovative Plastics, Pittsfield, Mass.), polypropylenes, acetals, acrylics, polyetherimides, polybutylene terephthalates, polyethylene terephthalates, and blends of such (co)polymers.

Method of Making Precision Molded Plastic Optical Elements

In other exemplary embodiments, the disclosure describes a molding method including the steps of:

providing an injection mold having a first mold member and at least one movable mold member that can move toward and away from the first mold member to close the mold, wherein a mold cavity is formed in at least one of the first or movable mold members, the cavity having at least one gate therein, and further wherein a source of ultrasonic energy is positioned to apply ultrasonic energy to the cavity; closing the mold, whereby the at least one gate is fluidly connected to a source of molten (co)polymer;

heating the mold to a mold temperature measured adjacent to the cavity of from 104° C. to 116° C.; thereafter injecting the molten (co)polymer into the cavity through the at least one gate of the closed mold to substantially fill the cavity and the gate with the molten (co)polymer;

allowing the closed mold to cool until the molten (co) polymer within the gate has solidified; applying ultrasonic energy from the source of ultrasonic energy to the molten (co)polymer in the cavity of the closed mold without remelting the solidified (co)polymer within the gate until the mold temperature has increased to between about 116° C. and 122° C., thereby substantially relieving any flow induced stresses in the molten (co)polymer; thereafter cooling the closed mold until the mold temperature has decreased to about 101° C. and 107° C.;

thereafter heating the closed mold until the mold temperature has increased to between about 116° C. and 122° C., thereby substantially relieving any thermally induced stresses in the molten (co)polymer; and thereafter allowing the mold to cool until the molten (co) polymer has solidified within the mold, thereby forming an injection molded article.

In additional exemplary embodiments of the foregoing molding methods, injecting the molten (co)polymer into the cavity through the at least one gate of the closed mold takes from about 0.5 to about 0.6 seconds. In some exemplary embodiments, allowing the closed mold to cool until the (co)polymer in the gate has solidified begins about 2 seconds and ends about 61 seconds after beginning the injecting of the molten (co)polymer into the cavity. In additional exemplary embodiments, applying ultrasonic energy from the source of ultrasonic energy to the molten (co)polymer within the cavity begins about 61 seconds and ends about 80 seconds after beginning the injecting of the molten (co)polymer into the cavity.

In further exemplary embodiments, allowing the closed mold to cool until the mold temperature has decreased to about 101° C. and 107° C. begins about 62 seconds and ends about 237 seconds after beginning the injecting of the molten (co)polymer into the cavity. In certain exemplary embodiments, heating the closed mold until the mold temperature has increased to between about 116° C. and 122° C. begins about 70 seconds to 115 seconds after beginning the injecting of the molten (co)polymer into the cavity, and ends about 70 to 110 seconds after heating begins. In some exemplary embodiments, the total time elapsed from closing the mold until the (co)polymer has solidified within the mold, is at least about 145 seconds, and less than about 240 seconds.

In any of the foregoing exemplary molding methods, applying ultrasonic energy from the source of ultrasonic energy to the molten (co)polymer in the cavity of the closed mold until the mold temperature has increased to between 116° C. and 122° C. begins only after allowing the closed mold to cool until the molten (co)polymer within the gate has solidified. In some exemplary embodiments, injecting the molten (co)polymer into the cavity further includes applying ultrasonic energy from the source of ultrasonic energy to the molten (co)polymer within the cavity. In certain exemplary embodiments, allowing the closed mold to cool until the (co)polymer in the gate has solidified comprises discontinuing applying ultrasonic energy to the cavity.

In further exemplary embodiments of the foregoing molding methods, a quantity of molten (co)polymer injected into the cavity is greater than a quantity required to fill the mold cavity, and excess (co)polymer flows out of the cavity through a vent.

Part of the injection of (co)polymer melt into the mold cavity 100' may be based on reaching a certain pressure 100' ("pack pressure") within the mold cavity. Pack pressure (e.g., in the range of 3.5 to 250 megaPascals (MPa) or 34.5 to 138 MPa) may be applied for a finite time (referred to as "hold time"). In some exemplary embodiments, a pack pressure of at least about 10 MPa, more preferably about 50 MPa, even more preferably at least about 100 MPa, 150 MPa, or even 200 MPa may be used to achieve uniform filling of the mold cavity 100'. Subsequently, pack pressure is released, and the material within the mold cavity is cooled to an ejection temperature normally at or below the (co)polymer softening temperature. Then, the mold members are separated, and the molded article is ejected from the mold cavity.

Useful molding parameters for the presently preferred molding method are: injection velocity of 60-360 mm/sec; preferred pack pressure of 3.5-207 MPa, more preferably 103-138 MPa; hold time of 0.5-10 seconds; mold temperature at injection (for polycarbonate) of 49°-150° C., preferably less than 121° C.; mold temperature at ejection (for polycarbonate) of 49°-138° C., preferably less than 121° C. The maximum amplitude measured at the face of the horn at 100% is preferably 0.7 mils peak to peak.

Unexpected Results and Advantages of the Molding Method

In certain exemplary embodiments, the molded article exhibits at least one beneficial characteristic selected from the group consisting of a substantial absence of birefringence, a substantial absence of residual stresses, a substantial absence of sink marks, a substantial absence of knit marks, a substantial absence of weld lines, a substantial absence of voids, or a combination thereof.

Without wishing to be bound by any particular theory, it is presently believed that, because the temperature difference between the (co)polymer melt and the mold cavity surface is reduced (by comparison with known techniques) when rapid heating and/or cooling is used in the inventive molding process, the resulting molded article will not experience shrinkage to the same extent as parts molded in conventional processes. Articles made without rapid heating and/or cooling display an interference pattern when viewed under a 45° cross polarizer indicating anisotropy; whereas, an optical element made using rapid heating and/or cooling as described above showed a distinctly different pattern under polarized light indicating a reduction in anisotropy. With the use of rapid heating and/or cooling, in-mold stress due to shrinkage may be reduced or even eliminated.

Exemplary embodiments of the present disclosure have been described above and are further illustrated below by way of the following Examples, which are not to be construed in any way as imposing limitations upon the scope of the present invention. On the contrary, it is to be clearly understood that resort may be had to various other embodiments, modifications, and equivalents thereof which, after reading the description herein, may suggest themselves to those skilled in the art without departing from the spirit of the present disclosure and/or the scope of the appended claims.

EXAMPLES

The following examples are intended to illustrate exemplary embodiments within the scope of this disclosure. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Materials

Two (co)polymers were used in the Examples:

Acrypet WF-100 is an optical grade [very low haze (0.5%), high optical transmittance (92.4%)] acrylic copolymer (available from Mitsubishi Plastics, Inc., Tokyo, Japan).

Arkema V825-100 is an acrylic copolymer (available from Arkema, Inc., Philadelphia, Pa.).

Test Methods

Molding defects, such as sink marks, knit lines, and the like, were visually observed in the molded articles under indirect illumination.

Residual stresses within the molded parts was visually assessed using incident polarized light, observing the molded part through a set of crossed-polarizers. This well known bi-refringence test configuration is generally described in ASTM D4093-95(2010), "Standard Test Method for Photoelastic Measurements of Birefringence and Residual Strains in Transparent or Translucent Plastic Materials." The criterion for measuring residual stresses was a visual qualitative method, where parts were ranked from 1 to 5; 5 being excellent and 1 being poor.

Apparatus

An ultrasonic-assisted injection molding apparatus 212 as generally shown in FIGS. 2-3 was used to mold precision optical parts (e.g. beam splitting prisms) as shown generally in FIG. 1. First mold member 224 was not configured with the optional cold slug or riser 223, or the optional overflow runner 231. Electrical resistance cartridge heaters 232 were positioned proximate the mold cavity 100' to achieve rapid heating of the (co)polymer within the mold cavity 100'.

A crossed-ultrasonic-horn 214 was used. As shown in FIG. 3, the ultrasonic horn 214 was connected to two 1:1 orthogonally-positioned boosters 216-216', and each booster 216-216' was connected to an ultrasonic transducer 218-218', each in turn connected to a source of electrical power. Suitable ultrasonic horns, boosters, transducers, and power sources are well known in the art (see, for example, U.S. Pat. No. 5,017, 311 (Furusawa et al.); U.S. Pat. No. 6,464,485 (Iida et al.); and PCT International Publication No. WO 2008/157592 (Ferguson et al.)).

The ultrasonic horn 214 described in the exemplary embodiments of the present disclosure was made of titanium. The measured amplitude at the mold face of the horn at 100% amplitude was determined to be 0.80 mil (20 micrometers) peak to peak. In order to start the horn under no load conditions, a proximity switch positioned proximate the first mold member 224, was used to provide a start signal to the ultrasonic energy source for each ultrasonic horn as soon as the mold started to close.

Preparatory Examples

Experiments were conducted to evaluate the significance of ultrasonic parameters and evaluate its effect on physical properties like knit lines and sink marks as well as optical properties such as stress. The factors for the experiments were: Pre-trigger ultrasonic amplitude, Pressure trigger ultrasonic amplitude, pressure time, cooling time and annealing time. Pre-trigger in this case is referred to when the horn starts to vibrate while the mold is closing and the cavity is filling. The Pre-trigger time was held constant at 6.45 sec, while the magnitude of the amplitude was varied from 10%-64%.

After the Pre-trigger time had elapsed, (molten (co)polymer was injected into the sprue 222 and the mold cavity 100' began to fill. The injection velocity was held constant at (0.9 in/sec). Once the cavity was full, ultrasonic vibrations were stopped to help let the gate freeze off. Once the inlet gate is frozen (i.e. the (co)polymer within the gate has solidified), the ultrasonic vibrations were again activated. Such post trigger application of ultrasonic vibrational energy to the mold cavity 100' is referred to as pressure trigger and is varied in magnitude from 10%-50% in this experiment. The pressure trigger happens during the pack and holding stages of the molding cycle. The pressure trigger time is referenced with respect to the duration over which the ultrasonic energy is applied to the ultrasonic horn, and was varied from 10 sec to 155 seconds.

The cooling time was varied from 30 sec-300 seconds. After the part was ejected, the part is then put into an air convection oven at 90° F. for annealing purposes. The annealing time was varied from 0-6.5 minutes (390 seconds). The temperature of the two halves of the mold was held constant and was as follows: mold A-side (fixed first mold member 224) at 230° F. (about 121° C.) and mold B-side (movable mold member 228) at 250° F. (about 121° C.). Here, the first mold member 224 adjoins the ultrasonic horn on the side opposite the mold cavity 100' (i.e. the "A-side" of the mold). Any optional additional post-molding annealing was carried out at 90° F. (about 32° C.) in a conventional oven for about 6 minutes.

Preparatory experiments were carried out in order to understand the relationship between molding parameters and application of ultrasonic energy to the mold cavity on the resulting molded part geometry and residual stresses in the molded parts. The ranges of molding parameters varied in the preparatory experiments were as follows:
1. Pre-trigger amplitude: 10%-64%
2. Pressure-trigger amplitude: 10%-50%
3. Cooling time: 30 sec-300 sec
4. Annealing time: 0-390 sec
5. Pressure-trigger time: 10 sec-155 sec The responses for these preparatory experiments were measured as follows:
1. Knit lines were visually observed in the optical beam splitting prism
2. Sink marks visually observed in the optical beam splitting prism
3. Residual stresses visually observed as bi-refringence in the optical beam splitting prism as viewed from the top (The optical beam splitting prism was resting on its flat surface).
4. Residual stresses visually observed as bi-refringence in the optical beam splitting prism as viewed from the top (the optical beam splitting prism was resting on its side).
5. Residual stresses visually observed as bi-refringence in the optical beam splitting prism as viewed in the corners of the flat side of the optical beam splitting prism (The optical beam splitting prism was resting on its flat surface).

Four variables were discovered to have the most effect on residual stresses in the molded optical article. The first was application of ultrasonic vibration energy during the fill cycle, which is referred to as Pre-trigger amplitude. The second is Pressure amplitude, which is the amplitude of ultrasonic vibration energy applied during the cooling cycle time of the molding cycle. Cooling time and annealing at the end of the cycle were the two other variables having the greatest impact on residual stresses in the molded article. The following additional observations were made:
1. The analysis revealed that the amplitude of ultrasonic vibration is a significant factor in both Pre-trigger and Pressure-trigger.
2. The timing of ultrasonic energy applied to the mold (i.e. Pre-trigger and Pressure-trigger duration) affects sink line and flash formation.
3. Application of ultrasonic energy to the mold cavity started after the inlet gate completely froze (i.e. after the (co)polymer in the inlet gate had at least partially solidified). This greatly reduced the amount of flash and the demand on the peak power from the ultrasonic energy power supplies.
4. Equally important is the timing of the heater with respect to the cycle.
5. The application of ultrasonic energy was started first during the hold time for the (co)polymer in the mold.
6. Due to the application of ultrasonic vibrational energy, the temperature of the (co)polymer in the mold cavity 100' rises rapidly.
7. It should be noted that the duration and amplitude (%) of the applied ultrasonic vibrational energy affects this peak temperature. Optimum reduction of stresses can be achieved under higher amplitude application of ultrasonic vibrational energy for shorter application times.
8. After the (co)polymer in the mold cavity 100' starts to cool, the temperature achieves the set point mold temperature; electrical resistance cartridge heaters were activated to maintain a constant temperature in the cooling cycle of the molding process.
9. Residual stresses in the molded parts are reduced by maintaining a constant temperature with the cartridge heaters during the cool time. The longer soak time in the cooling period is believed to permit the electrical resistance cartridge heaters to maintain a constant or nearly constant temperature of the (co)polymer in the mold cavity 100', thus reducing residual stresses in the molded articles.

Example 1

Example 1 illustrates a presently preferred embodiment of the disclosure, determined at the following conditions:

1. Ultrasonic horn amplitude of 45% (0.35 mils or 8.75 micrometers peak to peak)
2. Sonication time of 20 sec
3. Heating time of 70 seconds
4. Heater delay time of 115 seconds Acrypet WF-100 (Run 1) and Arkema V825-100 (Run 2) were used separately in this Example.

Figure 5A:
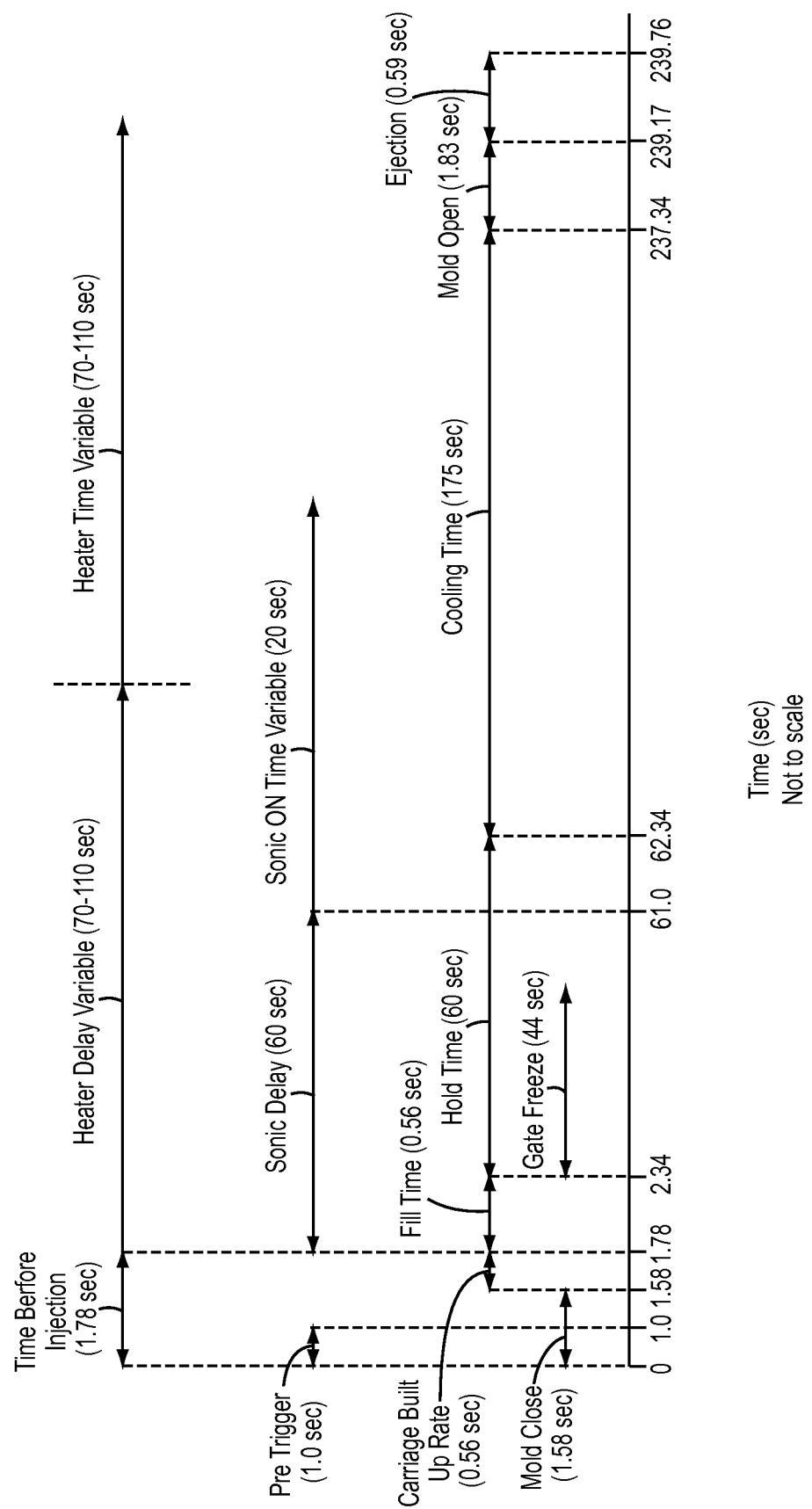
FIG. 5A is an exemplary process timing diagram for an ultrasonic-assisted molding process according to certain embodiments of the present disclosure.

FIG. 5A is an exemplary process timing diagram for an ultrasonic-assisted molding process according to certain embodiments of the present disclosure. The timing diagram shown in FIG. 5A describes the timing used for the delay in applying the ultrasonic vibrational energy and the delay in applying electrical energy to the electrical resistance cartridge heaters. A proximity switch was used to pre-trigger the ultrasonic horn to apply ultrasonic vibrational energy to the mold when the two halves of the mold were closed. By closing this switch when the two halves of the mold were open, it was possible to tune the vibrational frequency of the ultrasonic horn under no load conditions, thereby allowing retuning of the horn for each injection molding cycle and allowing for more consistent application of ultrasonic vibrational energy to the mold cavity 100'.

Samples were generated by varying these factors and were evaluated against a response of four criteria: stresses at all the four corners, gate stresses, stresses in the part as viewed from the top side and stresses in the part as viewed from side view.

In the illustrative exemplary embodiment, a source of ultrasonic energy was positioned to apply ultrasonic vibrational energy from an ultrasonic horn 214 (FIG. 3) to a mold cavity 100' (FIG. 4) connected to at least one inlet gate 227 in flow communication with a source of molten (co)polymer (e.g. sprue 222). The mold was pre-heated to a temperature of 104-116° C., and the molten (co)polymer was injected into the mold cavity 100'.

After cooling the mold until the molten (co)polymer within the inlet gate 227 had at least partially solidified, ultrasonic energy was applied to the mold without remelting the solidified (co)polymer within the inlet gate 227, until the temperature increased to about 116-122° C., thereby substantially relieving flow induced stresses. The mold was then cooled until the temperature decreased to 101-107° C., and was thereafter heated until the temperature increased to 116-122° C., thereby substantially relieving thermally induced stresses. The mold was then cooled until the molten (co)polymer had solidified, thereby forming a precision molded plastic optical element (or part).

Figure 5B:
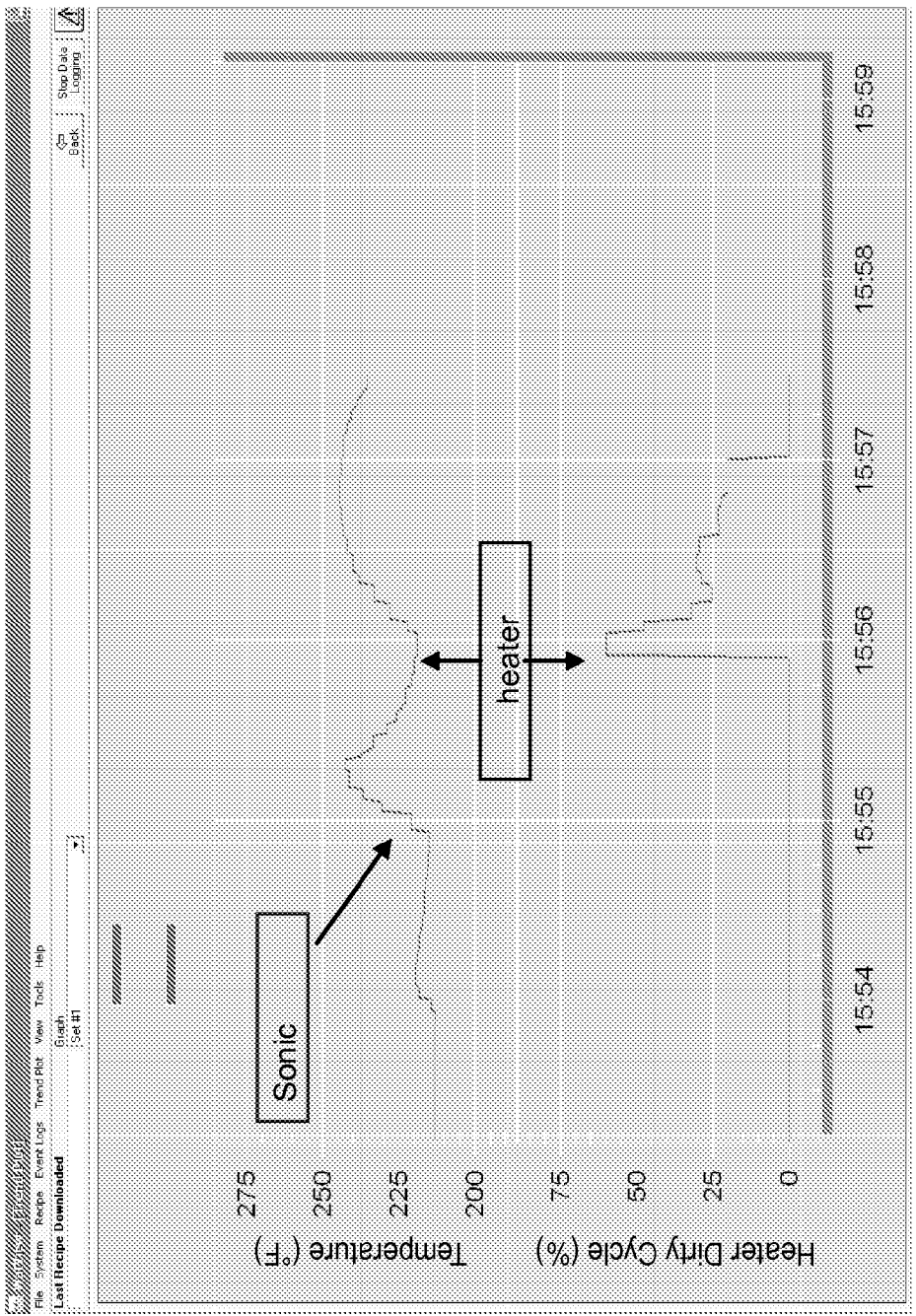
FIG. 5B is a plot of the mold temperature and heater duty cycle obtained using the process timing sequence shown in FIG. 5A in an exemplary molding process according to certain embodiments of the present disclosure.

FIG. 5B is a plot of the mold temperature and heater duty cycle obtained using the process timing sequence shown in FIG. 5A in an exemplary molding process according to an exemplary embodiment of the present disclosure. FIG. 5B shows an increase in the mold temperature due to application of ultrasonic vibrational energy and cartridge heaters. It also shows when during the molding cycle the heaters are activated to effect the soak time of the part (i.e. Heater Duty Cycle, expressed as a percentage). In obtaining the temperature measurements shown in FIG. 5B, the thermocouple was located between the cartridge heaters and the cavity wall in the B side (movable mold member 228) of the mold.

As shown in FIG. 5B, as the molten (co)polymer was injected into the mold, the temperature (as measured by a thermocouple positioned proximate mold cavity 100') increased to 218° F. (about 103° C.) from its pre-heated temperature of 213° F. (about 100.6° C.). Subsequently, the (co)polymer began to cool. Once the initial temperature of 213° F. (about 100.6° C.) was reached and the gate was frozen (i.e. the (co)polymer within the gate had at least partially or even entirely solidified), the ultrasonic vibrational energy was again activated. This increased the temperature (as shown by the temperature increase in FIG. 5B) to approach the peak heat distortion temperature of the (co)polymer (about 242° F. or about 140° C.)).

After the cavity temperature as measured by the thermocouple reached about 217° F. (about 103° C.), the (co)polymer in the mold cavity 100' was then allowed a soak time. After this soak time, the electrical resistance cartridge heaters were energized to attain a similar peak temperature of 245° F. (about 118° C.) as achieved by application of vibrational ultrasonic energy. At the peak temperature the cavity temperature was maintained for about 70 seconds. The lower curve in FIG. 5B shows the Duty Cycle of the electrical resistance cartridge heaters as they attempt to maintain a setpoint temperature of 240° F.

Even though a shorter cycle time was achieved using thermal cycling and application of ultrasonic vibrational energy, there is a slight haze seen in the molded part. To improve upon the quality, parts were annealed in a convection oven at 90° F. (about 32° C.) for 6 minutes. Annealing cleared the residual haze of the molded part. Annealing does not add substantial cycle time to the molding process, as we contemplate use of a continuous oven positioned after the molding machine in manufacturing, where the first part offsets the time by 6 minutes, but all other parts thereafter do not. Hence cycle times are only compared to molding cycle times.

The sonic delay and heater times were both started at the beginning of the injection cycle with the signal coming from an air blow valve. Timing was initiated as soon as the mold starts to close. The sonic delay and the heater delay timers were both started as soon as the carriage built up rate of 0.2 seconds is achieved. After a delay of 60 seconds the ultrasonic transducers 218 were activated and after a delay of 115 seconds, the electrical resistance cartridge heaters were activated. It should be noted that both timers for the ultrasonic transducers and heaters ran concurrently. It should also be noted that the entire injection molding cycle time, including part ejection, was typically only about 4 minutes.

Longer cool times were needed for both WF100 and V825 materials to have acceptable parts without knit lines, as one can infer that annealing is not the main variable to influence knit lines. For elimination of sink marks, longer cooling times are preferred for both WF100 and V825-100 materials. The cooling time for V825-100 was not responsive to annealing, whereas for WF100, the cooling time can be shortened using annealing times in excess of approximately 6 minutes (360 seconds).

The primary factors affecting residual stresses in the molded part are cool time and ultrasonic amplitude during the cool stage, whereas the primary factors affecting part geometry are cool time and annealing time. The two main variables for WF100 that influence corner residual stresses are cool time and Pressure-trigger amplitude. In the case of V825-100, the main variables are cool time and annealing time, though WF100 did not produce the desired optical clarity of the molded precision optical component.

The two main variables for WF100 that influence side view residual stresses are cool time and Pressure-trigger amplitude. In case of V825-100, main variables are cool time and annealing time, it seems that maybe with increased annealing time we may get better optical clarity for V825-100. The two main variables for WF100 that influence top view residual stresses are cool time and Pressure-trigger amplitude. In case of V825-100, main variables are cool time and annealing time, it seems that maybe with increased annealing time we may get better optical clarity for V825-100.

Cooling time is the main variable that affects sink marks, knit lines and stresses for WF100. The main variable influencing corner stresses for WF100 is the use of ultrasonic vibrations during molding. However, there is no conclusive proof that ultrasonic affects V825-100 in a positive way. Having said that, it should be noted that V825-100 material is very different and it could be that we need to be at higher temperature than what was ran this experiment to see any effect of application of ultrasonic vibrational energy. Molding parameters like injection velocity and/or gate design may affect the stresses in V825-100 differently also.

FIGS. 6A-9B provide some representative images of injection molded optical elements in the form of polarized beam splitting prisms with and without the use of ultrasonic energy. The images were taken under cross-polarizers to clearly illustrate the birefringence inherent in the part.

Figure 6A:
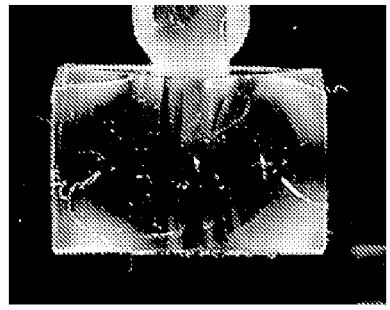
FIGS. 6A-6B are bottom (FIG. 6A) and side (FIG. 6B) view bi-refringent photographs of an exemplary precisely-shaped optical element (prism) prepared according to an exemplary ultrasonic-assisted injection molding method of the present disclosure.
Figure 6B:
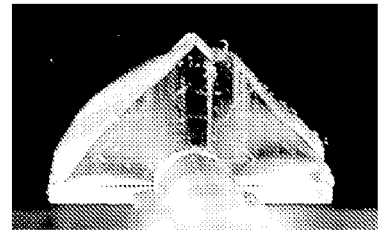

FIGS. 6A-6B are bottom (FIG. 6A) and side (FIG. 6B) view bi-refringent photographs of an exemplary precisely-shaped optical element (prism) prepared according to an exemplary ultrasonic-assisted injection molding method of the present disclosure. FIGS. 6A-6B illustrate the beneficial reduction in molding defects and residual stresses resulting from use of the above-described in-mold heating alone.

Figure 7A:
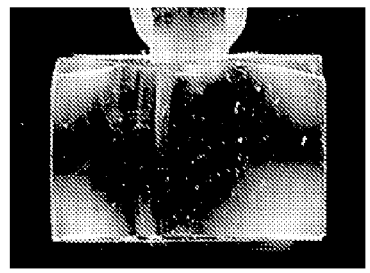
FIGS. 7A-7B are bottom (FIG. 7A) and side (FIG. 7B) view bi-refringent photographs of an exemplary precisely-shaped optical element (prism) prepared according to an exemplary ultrasonic-assisted injection molding method of the present disclosure.
Figure 7B:
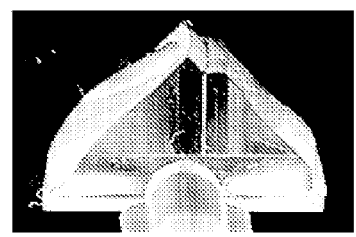

FIGS. 7A-7B are bottom (FIG. 7A) and side (FIG. 7B) view bi-refringent photographs of an exemplary precisely-shaped optical element (prism) prepared according to an exemplary ultrasonic-assisted injection molding method of the present disclosure. FIGS. 7A-7B illustrate the beneficial reduction in molding defects and residual stresses resulting from use of the above-described in-mold heating and the above-described post-molding annealing step.

Figure 8A:
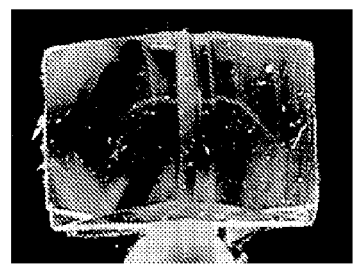
FIGS. 8A-8B are bottom (FIG. 8A) and side (FIG. 8B) view bi-refringent photographs of an exemplary precisely-shaped optical element (prism) prepared according to an exemplary ultrasonic-assisted injection molding method of the present disclosure.
Figure 8B:

FIGS. 8A-8B are bottom (FIG. 8A) and side (FIG. 8B) view bi-refringent photographs of an exemplary precisely-shaped optical element (prism) prepared according to an exemplary ultrasonic-assisted injection molding method of the present disclosure. FIGS. 8A-8B illustrate the beneficial reduction in molding defects and residual stresses resulting from use of the above-described in-mold heating and the above-described application of ultrasonic vibrational energy during the molding process.

Figure 9A:
FIGS. 9A-9B are bottom (FIG. 9A) and side (FIG. 9B) view bi-refringent photographs of an exemplary precisely-shaped optical element (prism) prepared according to an exemplary ultrasonic-assisted injection molding method of the present disclosure.
Figure 9B:
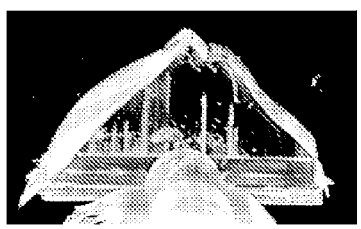

FIGS. 9A-9B are bottom (FIG. 9A) and side (FIG. 9B) view bi-refringent photographs of an exemplary precisely-shaped optical element (prism) prepared according to an exemplary ultrasonic-assisted injection molding method of the present disclosure. FIGS. 9A-9B illustrate the beneficial reduction in molding defects and residual stresses resulting from use of the above-described in-mold heating, the above-described application of ultrasonic vibrational energy during the molding process, and the above-described post-molding annealing step.

Figure 10A:
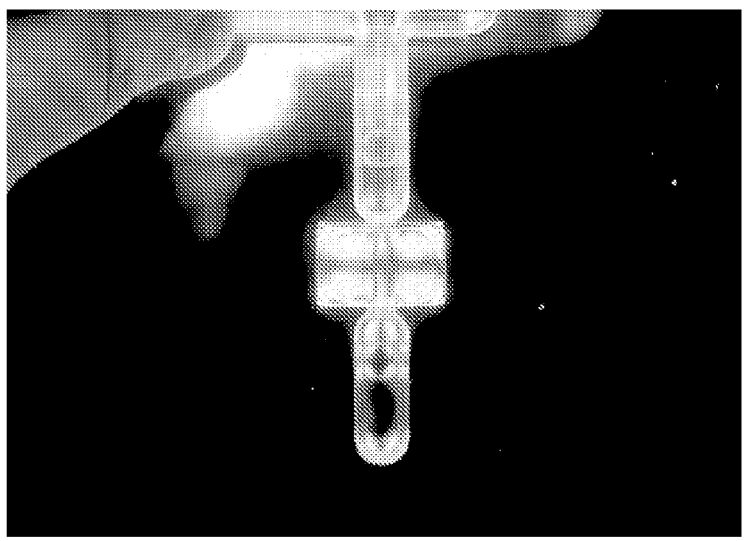
FIGS. 10A-10C are bottom (FIG. 10A), side (FIG. 10B) and tilted side (10C) view bi-refringent photographs of an exemplary precisely-shaped optical element (beam splitting prism) prepared according to a conventional non-ultrasonic-assisted injection molding method.
Figure 10B:
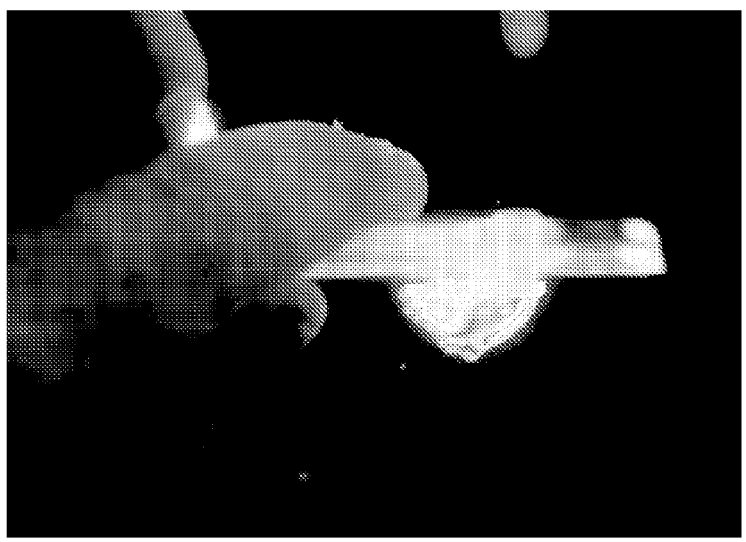
Figure 10C:
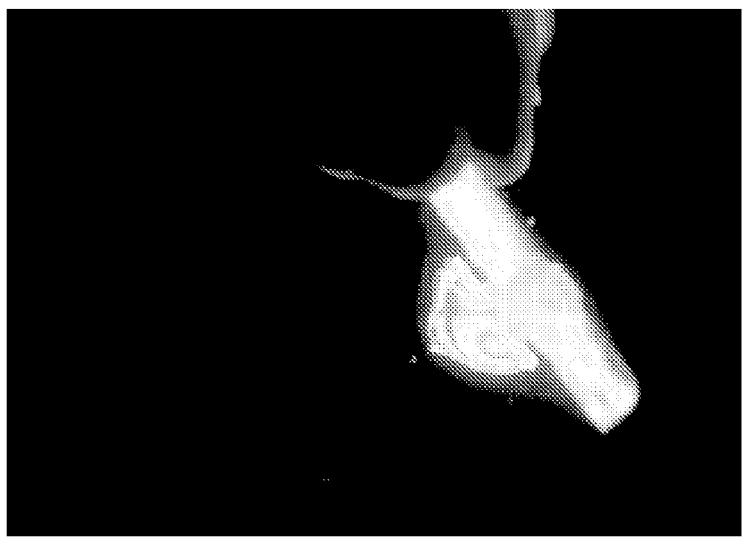

FIGS. 10A-10C are bottom (FIG. 10A), side (FIG. 10B) and tilted side (10C) view bi-refringent photographs of an exemplary precisely-shaped optical element (beam splitting prism) prepared according to a conventional non-ultrasonic-assisted injection molding method.

Figure 11A:
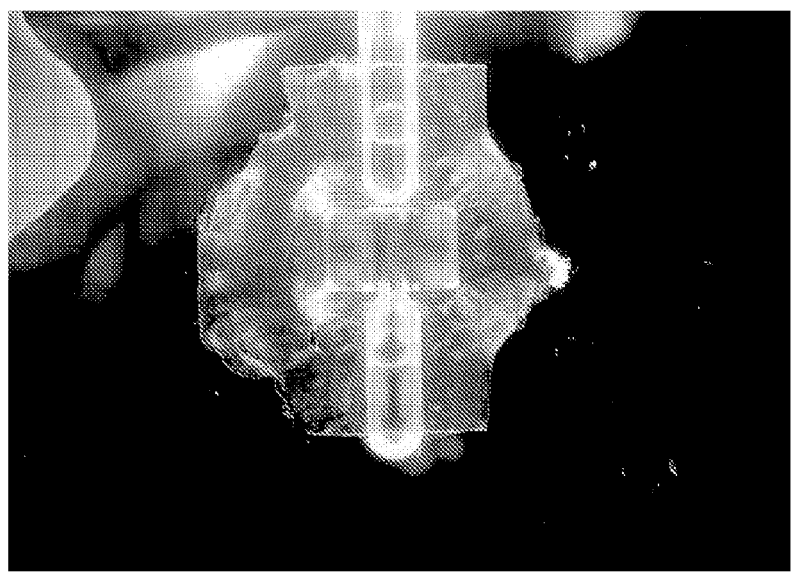
FIGS. 11A-11C are bottom (FIG. 11A), side (FIG. 11B) and tilted side (11C) view bi-refringent photographs of an exemplary precisely-shaped optical element (beam splitting prism) prepared according to an exemplary ultrasonic-assisted injection molding method of the present disclosure.
Figure 11B:
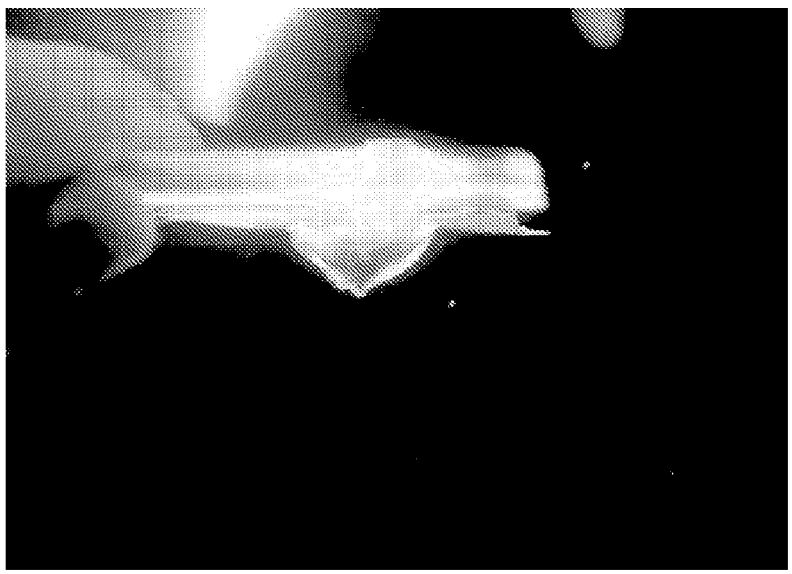
Figure 11C:

FIGS. 11A-11C are bottom (FIG. 11A), side (FIG. 11B) and tilted side (11C) view bi-refringent photographs of an exemplary precisely-shaped optical element (beam splitting prism) prepared according to an exemplary ultrasonic-assisted injection molding method of the present disclosure.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove.

Furthermore, all publications, published patent applications and issued patents referenced herein are incorporated by reference in their entirety to the same extent as if each individual publication or patent was specifically and individually indicated to be incorporated by reference. Various exemplary embodiments have been described. These and other embodiments are within the scope of the following listing of disclosed embodiments.

What is claimed is:

1. A molding method, comprising:
   providing an injection mold having a first mold member and at least one movable mold member that can move toward and away from the first mold member to close the mold, wherein a mold cavity is formed in at least one of the first or movable mold members, the cavity having at least one gate therein, and further wherein a source of ultrasonic energy is positioned to apply ultrasonic energy to the cavity;
   closing the mold, whereby the at least one gate is fluidly connected to a source of molten (co)polymer;
   heating the mold to a mold temperature measured adjacent to the cavity of from 104° C. to 116° C.;
   thereafter injecting the molten (co)polymer into the cavity through the at least one gate of the closed mold to substantially fill the cavity and the gate with the molten (co)polymer;
   allowing the closed mold to cool until the molten (co)polymer within the gate has solidified;
   applying ultrasonic energy from the source of ultrasonic energy to the molten (co)polymer in the cavity of the closed mold without remelting the solidified (co)polymer within the gate until the mold temperature has increased to between about 116° C. and 122° C., thereby substantially relieving any flow induced stresses in the molten (co)polymer;
   thereafter cooling the closed mold until the mold temperature has decreased to about 101° C. and 107° C.;
   thereafter heating the closed mold until the mold temperature has increased to between about 116° C. and 122° C., thereby substantially relieving any thermally induced stresses in the molten (co)polymer; and
   thereafter allowing the mold to cool until the molten (co)polymer has solidified within the mold, thereby forming an injection molded article.

2. The molding method of claim 1, wherein heating the mold to the mold temperature from 104° C. to 116° C. occurs after closing the mold.

3. The molding method of claim 1, wherein applying ultrasonic energy from the source of ultrasonic energy to the molten (co)polymer in the cavity of the closed mold until the mold temperature has increased to between 116° C. and 122° C. begins only after allowing the closed mold to cool until the molten (co)polymer within the gate has solidified.

4. The molding method of claim 1, wherein injecting the molten (co)polymer into the cavity further comprises applying ultrasonic energy from the source of ultrasonic energy to the molten (co)polymer within the cavity.

5. The molding method of claim 4, wherein allowing the closed mold to cool until the (co)polymer in the gate has solidified comprises discontinuing applying ultrasonic energy to the cavity.

6. The molding method of claim 1, wherein injecting the molten (co)polymer into the cavity through the at least one gate of the closed mold takes from about 0.5 to about 0.6 seconds.

7. The molding method of claim 1, wherein allowing the closed mold to cool until the (co)polymer in the gate has solidified begins about 2 seconds and ends about 61 seconds after beginning the injecting of the molten (co)polymer into the cavity.

8. The molding method of claim 1, wherein applying ultrasonic energy from the source of ultrasonic energy to the molten (co)polymer within the cavity begins about 61 seconds and ends about 80 seconds after beginning the injecting of the molten (co)polymer into the cavity.

9. The molding method of claim 1, wherein allowing the closed mold to cool until the mold temperature has decreased to about 101° C. and 107° C. begins about 62 seconds and ends about 237 seconds after beginning the injecting of the molten (co)polymer into the cavity.

10. The molding method of claim 1, wherein heating the closed mold until the mold temperature has increased to between about 116° C. and 122° C. begins about 70 seconds to 115 seconds after beginning the injecting of the molten (co)polymer into the cavity, and ends about 70 to 110 seconds after heating begins.

11. The molding method of claim 1, wherein the total time elapsed from closing the mold until the (co)polymer has solidified within the mold, is at least about 145 seconds, and less than about 240 seconds.

12. The molding method of claim 1, further comprising removing the injection molded article from the mold cavity by means of an ejector means selected from one or more of an ejector pin, a lifter, a stripper plate, or a combination thereof.

13. The molding method of claim 1, wherein a quantity of molten (co)polymer injected into the cavity is greater than a quantity required to fill the mold cavity, and excess (co)polymer flows out of the cavity through a vent.

14. The molding method of claim 1, wherein the inlet gate is at the center of one side of the mold cavity.

15. The molding method any preceding of claim 1, wherein the molten (co)polymer is injected into the mold cavity from a first side of the mold cavity adjoining the first mold member, and the ultrasonic energy is applied from a second side of the mold cavity adjoining the movable mold member.

16. The molding method any preceding of claim 1, wherein heating the mold cavity is carried out using electrical resistance heating, electromagnetic induction heating, dielectric heating, thermoelectric heating, heating by application of ultrasonic energy, or a combination thereof.

17. The molding method of claim 16, wherein heating the mold cavity is carried out using electrical resistance heating, and further wherein at least one electrical resistance heater is positioned proximate the mold cavity so as to enable heating the (co)polymer within the mold cavity at a rate sufficient to cause the temperature of the molten (co)polymer within the mold cavity to increase at a rate of at least about 13° C. per minute.

18. The molding method of claim 1, wherein the mold comprises a material selected from the group consisting of steel, stainless steel, copper, beryllium, aluminum, an alloy thereof, or a combination thereof.

19. The molding method of claim 1, wherein the source of ultrasonic energy comprises an ultrasonic transducer, optionally including at least one of a resonant horn, a booster, a waveguide, or a combination thereof.

\* \* \* \* \*